US008577665B2

(12) United States Patent
Murthy et al.

(10) Patent No.: US 8,577,665 B2
(45) Date of Patent: Nov. 5, 2013

(54) SYNTHESIS OF MESSAGE SEQUENCE CHARTS FROM COMMUNICATING FINITE-STATE MACHINES

(75) Inventors: Praveen K. Murthy, Fremont, CA (US); Cong Liu, Richmond, CA (US)

(73) Assignee: Fujitsu Limited, Kawasaki (JP)

( * ) Notice: Subject to any disclaimer, the term of this patent is extended or adjusted under 35 U.S.C. 154(b) by 1398 days.

(21) Appl. No.: 12/048,648

(22) Filed: Mar. 14, 2008

(65) Prior Publication Data

US 2009/0235226 A1 Sep. 17, 2009

(51) Int. Cl.
*G06F 9/455* (2006.01)
*G06F 9/45* (2006.01)

(52) U.S. Cl.
USPC .............................. 703/22; 717/136; 717/137

(58) Field of Classification Search
USPC .......................................................... 717/104
See application file for complete search history.

(56) References Cited

PUBLICATIONS

Pattavina et al. "Combined Use of Finite-State Machines and Petri Nets for Modelling Communicationg Processes", Electronic Letters, Oct. 25, 1984, vol. 20, No. 22, pp. 916-916.*
Murata, T. "Petri Nets: Properties, Analysis and Applications", Proceedings of the IEEE, Apr. 1989, vol. 77, No. 4, pp. 541-580.*
Eichner et al. "Compositional Semantics for UML 2.0 Sequence Diagrams Using Petri Nets" 2005, LNCS 3530, pp. 133-148.*
Genest et al. "Specifying and Verifying PArtial Order Properties Using Template MSCs", FOSSACS 2004, LNCS 2987, pp. 195-210.*
Peng, W. "Deadlock detection in communicating finite state machines by even reachability analysis", Mobile Networks and Applications, 1997, vol. 2. pp. 251-257.*
Cortadella et al. "Quasi-Static Scheduling of Independent Tasks for REactive Systems", IEEE Transactions on Computer-Aided Design of INtegrated Circuits and Systems, vol. 24. No. 10, Oct. 2005, pp. 1492-1514.*
Cortadella et al. "Synthesizaing PEtri Nets from State-Based Models", IEEE, 1995, pp. 164-171.*
Jaragh et al. "Synthesis of communication protocol converters using the timed Petri net model", Journal fo Systems and Software vol. 47, 1999, pp. 53-69.*
Esparza et al. "Petri Nets and Regular Processes", Journal of Computer Systems and Sciences, vol. 59, No. 3 1999, pp. 476-503.*
ITU-T recommendation Z-120, Message sequence Chart, (MSC). ITU Telecommunication Standardization Sector, 2004.
P. Graubmann, E. Rudolph, and J. Grabowski. Towards a Petri Net Based Semantics Definition for Message. In: SDL '93—Using Objects (Editors: O. Faergemand A. Sarma), North-Holland, Oct. 1993.
A. Ito, H. Saito, F. Nitta, and Y. Kakuda. Transformation technique between specification in message sequence charts for designing protocol specifications. In ICC'92 IEEE International Conference on Communications, pp. 442-447, 1992.
G. Kahn. The semantics of a simple language for parallel programming. In Information processing, pp. 471-475, Aug. 1974.
G. Kahn and D.B. MacQueen. Coroutines and networks of parallel processes. In Information processing, pp. 993-998, Aug. 1977.

(Continued)

*Primary Examiner* — Suzanne Lo
(74) *Attorney, Agent, or Firm* — Staas & Halsey LLP

(57) ABSTRACT

Synthesizing a message sequence chart (MSC) from a communicating finite-state machine (CFSM), by transforming the CFSM to a Petri net model, generating a labeled finite digraph with each path representing a linearization of an occurrence net segment of the Petri net, decomposing the diagraph into segments, and mapping where each segment to a compositional MSC.

16 Claims, 13 Drawing Sheets

(56) References Cited

PUBLICATIONS

M. Lohrey. Safe realizability of high-level message sequence charts. In CONCUR '02: Proceedings of the 13$^{th}$ International Conference on Concurrency Theory, pp. 177-192, London, UK, 2002. Springer-Verlag.

P. Murthy, S. Rajan, and K. Takayama. High level hardware validation using hierarchical message sequence charts. In IEEE High Level Design Validation and Test Workshop, pp. 167-172, 2004.

R. Alur, K. Etessami, and M. Yannakakis. Inference of message sequence charts. In ICSE '00: Proceedings of the 22$^{nd}$ international conference on Software engineering, pp. 304-313, New York, NY, USA, 2000. ACM Press.

D. Brand and P. Zafiropulo. On communicating finite-state machines. J. ACM, 30(2):323-342, 1983.

J. Cortadella, A. Kondratyev, L. Lavagno, C. Passerone, and Y. Watanabe. Quasi-static scheduling of independent tasks for reactive systems. IEEE Transactions on Computer-Aided Design, 24(10): 1492-1514, 2005.

E. L. Gunter, A. Muscholl, and D. Peled. Compositional message sequence charts. In TACAS 2001: Proceedings of the 7$^{th}$ International Conference on Tools and Algorithms for the Construction and Analysis of Systems, pp. 496-511, London, UK, 2001, Springer-Verlag.

S. Uchitel, J. Kramer, and J. Magee. Incremental elaboration of scenario-based specifications and behavior models using implied scenarios. ACM Trans. Softw. Eng. Methodol., 13(1):37-85, 2004.

Programming Environment based on Petri Nets (PEP) Tool, Infos on PEP 2.0, [online], Sep. 9, 2004, [Retrieved on Mar. 30, 2012], Retrieved from the Internet: <URL: http://theoretica.informatick.uni-oldenburg.de/~pep/> (one page).

* cited by examiner

Two communicating finite-state machines bMSC and its associated partial order hcMSC

SYNTHESIS OF MESSAGE SEQUENCE CHARTS FROM COMMUNICATING FINITE-STATE MACHINES

BACKGROUND

1. Field

An example aspect of the invention relates to transformation of a state machine to a message sequence chart.

2. Description of the Related Art

The SPIN model checker specifies counter examples that it generates from model checking as a message sequence chart, however, this is restricted to only one possible behavior, and not a set of behaviors. Further, any message sequence chart that SPIN generates is not as a result of a behavior-preserving transformation from a finite state machine model. Further, reverse engineering tools, such as SUN ENTERPRISE STUDIO, only generate sequence diagrams from Java source and not controlled in number of processes.

SUMMARY

Message Sequence Charts (MSCs) and Communicating Finite-State Machines (CFSMs) are two popular formalisms used in the design of software, for example, telecommunications software systems. MSC focuses on the interactions between communicating entities, while CFSMs focus on the local state evolvement of each entity as a result of interactions. According to an aspect of an embodiment, a high-level compositional message sequence chart (HCMSC) is constructed to explicitly represent the interactions among CFSMs. HCMSC allows unmatched communication events in a basic compositional MSC. The synthesis starts with a transformation of CFSMs to a Petri net model. Then a labeled finite digraph is constructed, where each path represents a linearization of an occurrence net segment of the Petri net. According to an aspect of an embodiment, for example, exactly one such linearization (a single such linearization) from among many alternatives is explored and generated. In order to generate a compact representation, a linearization that could quickly lead to a cycle is favored. This allows infinitely repeated communication sequences to be folded into a finite and compact diagraph. Finally, the diagraph is decomposed into segments, where each segment is mapped to a compositional MSC.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

There are two general, complementary views of the dynamic behaviors of a distributed communicating system. One is based on scenarios, which focuses on the flows of message exchanges between communicating entities. The other is based on states, which focuses on the local state evolvement of each entity as a consequence of the communications. Message Sequence Charts (MSCs) and Communicating finite-state Machines (CFSMs) are two popular formalism representing the two views, respectively.

Figure 1A:
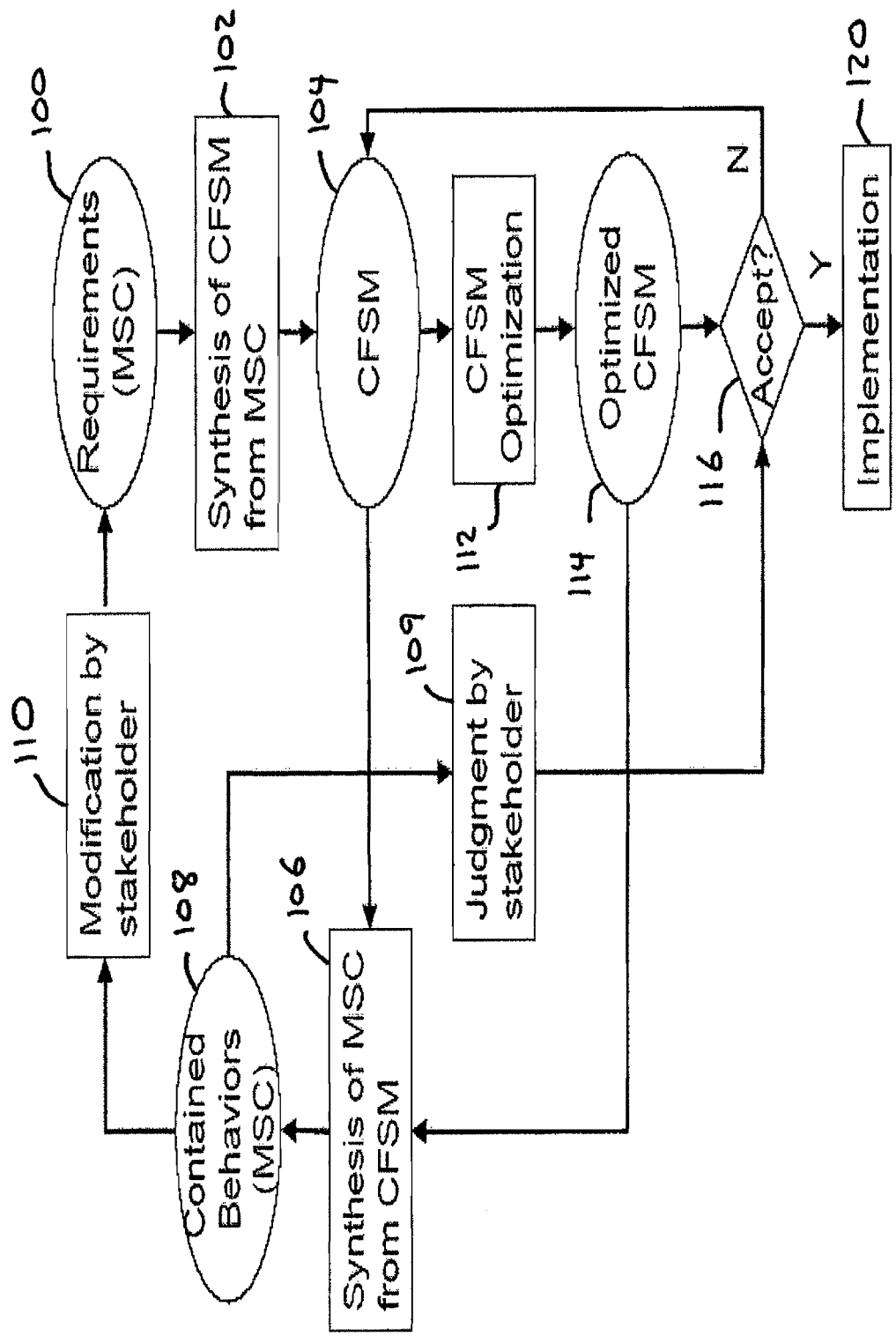
FIG. 1A is a diagram of an example MSC-based design flow, according to an embodiment.

The embodiments relate to the synthesis of MSCs from CFSMs. FIG. 1A is a diagram of an example MSC-based design flow according to an embodiment of the invention. The flow starts at 100 with a system specification or requirements described by a set of MSCs. Usually, the MSCs constitute a partial description of the desired behaviors. Then, at 102, a set of CFSMs are automatically synthesized from the MSCs. These CFSMs at 104 often contain all the behaviors of the MSCs and some unspecified behaviors. R. Alur, K. Etessami, and M. Yannakakis, "Inference of message sequence charts," In ICSE '00: Proceedings of the $22^{nd}$ international conference on Software engineering, pages 304-313, New York, N.Y., USA, 2000, ACM Press, discusses that sometimes the unspecified behaviors, also called implied scenarios, are inherent by implying that any synthesis will include unspecified behaviors for certain MSCs. Further, Markus Lohrey, "Safe realizability of high-level message sequence charts," In CONCUR '02: Proceedings of the 13th International Conference on Concurrency Theory, pages 177-192, London, UK, 2002, Springer-Verlag discusses that it is undecidable whether a high-level message sequence chart (HMSC) can be implemented by CFSMs. These negative results at 104 indicate that an iteration between MSC and CFSMs might be inevitable and/or useful before implementation at 120 of the requirements. For example, at 104, if the design stakeholders view any implied scenarios as undesirable behaviors, at 106, 108, 109, 116, and 110, modification of the requirements might be performed as needed, since otherwise the specification might be invalid. Meanwhile, it is also often desirable to manipulate the synthesized CFSMs before implementation at 120, for example, by optimization at 112, 114 and 116. Though standard optimization techniques, e.g. automata minimization, can be applied, the manipulation does not necessarily have to maintain trace equivalence, as long as the behaviors contained in the manipulated CFSMs are allowed by the design stakeholders. Thus, synthesis of MSCs from CFSMs at 106 are also needed for verification and/or debugging purposes.

Figure 1B:
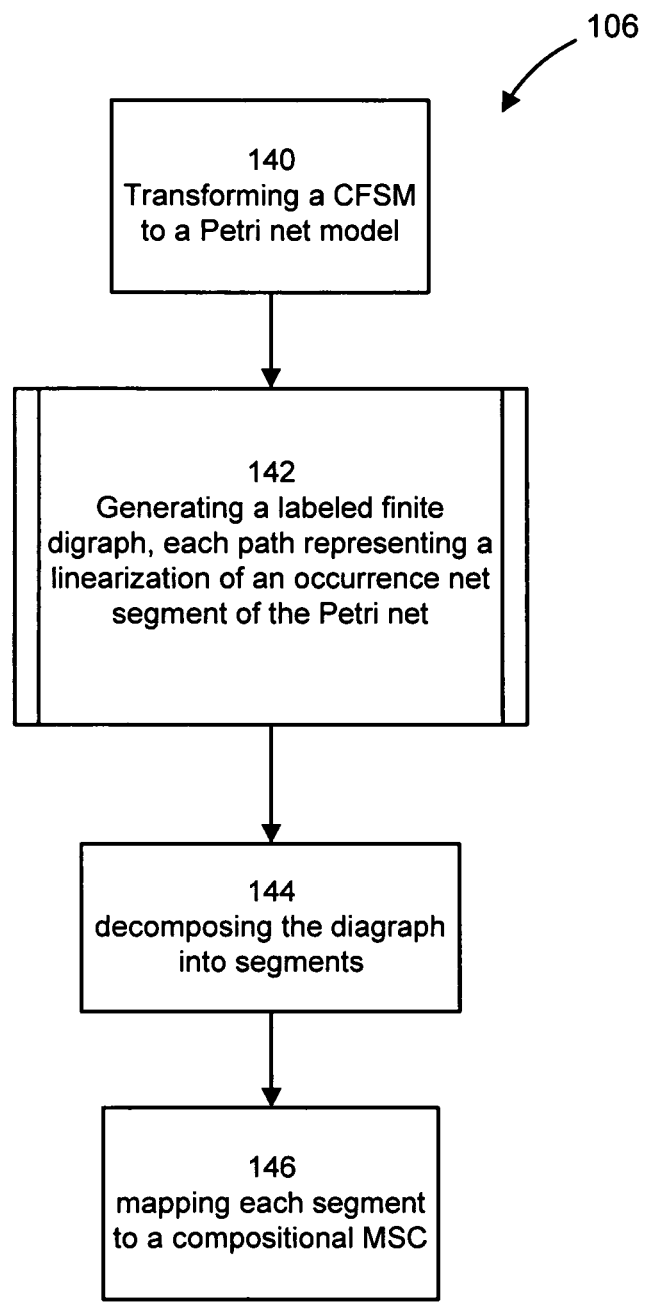
FIG. 1B is a flow chart of synthesizing an MSC from a CFSM, according to an embodiment.

FIG. 1B is a flow chart of synthesizing at 106 an MSC from a CFSM, according to an embodiment. CFSMs could be transformed to a Petri net representation. See, T. Murata, "Petri nets: properties, analysis, and applications," Proceedings of the IEEE, 77(4):541-580, April, 1989, which discusses occurrence nets correspond to message sequence charts. Thus, according to an aspect of an embodiment, synthesizing an MSC from a CFSM starts with transforming CFSMs to a Petri net. However, in contrast to conventional techniques, during the transformation, alternative transitions at a state are modeled by non-deterministic free choices (i.e., any transition from a free choice set of transitions can be fired, for example, a single such transition is fired wherever there is a free choice set of transitions). Then, by exploring all possible transitions in a selected free choice set by repeatedly selecting, for example, one transition whenever there is a subsequent free choice set of transitions and going back and similarly firing other transitions in the free choice sets, a complete set of behaviors in the selected free choice sets could be obtained. Then, a labeled diagraph is generated to compactly represent the occurrence nets of the obtained Petri net. Paths in the diagraph are labeled by representing sequences of transitions, a representative interleaving of partially ordered events (occurrence nets). These transitions correspond to events associated with finite-state machines. Thus, the partial ordering (occurrence nets) is reconstructed in an MSC by a mapping of these transitions to individual instance axes of the MSC. One example advantage of the embodiments in transforming the CFSM to a Petri net is exploring and generating exactly one (a single) interleaving of a partial ordering from among many alternatives, although the embodiments are not limited to such a configuration.

In FIG. 1B, at 140 a CFSM is transformed to a Petri net model. At 142, a labeled finite diagraph is generated with each path representing a linearization of an occurrence net segment of the Petri net. Block 142 is described in more detail in FIG. 7A. Then, at 144, the diagraph is decomposed into segment, and at 146, each digraph segment is mapped to a compositional MSC. According to an aspect of an embodiment, the flowchart of FIG. 1A conceptualizes a design methodology that requires going from CFSMs to MSCs in a high level design flow that makes use of MSCs. Although design flows that start from MSCs exist, conventional design flows do not contemplate a design flow according to FIG. 1A. Further, according to an aspect of an embodiment, CFSMs are transformed to MSCs via Petri Nets (e.g., CFSMs→Petri Nets→HCMSCs). Further, according to an aspect of an embodiment, an HCMSC is generated from a labeled digraph based upon unfolding the Petri Net (i.e., partially executing the Petri net) (142).

Sections 1, 2, and 3 generally describe Communicating Finite-State Machines (CFSMs), Message Sequence Chart (MSC) and Petri Net. In Section 4 the synthesis method, apparatus, and computer-readable medium thereof is described. Section 5 discusses applying the synthesis to some case studies.

1. Communicating Finite-State Machines (CFSMs). A network of communicating finite-state machines is a 4-tuple ($\langle S_i \rangle_{i=1}^N$, $\langle s_i^0 \rangle_{i=1}^N$, $\langle M_{ij} \rangle_{i,j=1}^N$, $\delta$). N is a positive integer, representing the number of communicating machines. $\langle S_i \rangle_{i=1}^N$ are N disjoint finite sets, where $S_i$ represents the set of states of machine i. $s_i^0 \in S_i$ represents the initial state of machine i. $\langle M_{ij} \rangle_{i,j=1}^N$ are $N^2$ disjoint finite sets with $M_{ii}=0$ for all i. $M_{ij}$ represents the set of messages can be sent from machine i to machine j, $\delta$ is a partial mapping for each process i and j, ($\delta$: $(S_i \times M_{ij}) \cup (S_i \times M_{ji}) \rightarrow S_i$. $\delta$ (s, m) represents the state entered after a machine transmits or receives message m in state s. It is a transmission if m is from $M_{i,j}$. It is a reception if m is from $M_{j,i}$.

CFSMs can be represented by a labeled directed graph, where nodes denote states, edges denote transitions. Transitions representing transmission of message m are labeled by −m. Transitions representing reception of message m are labeled by +m.

Figure 2:
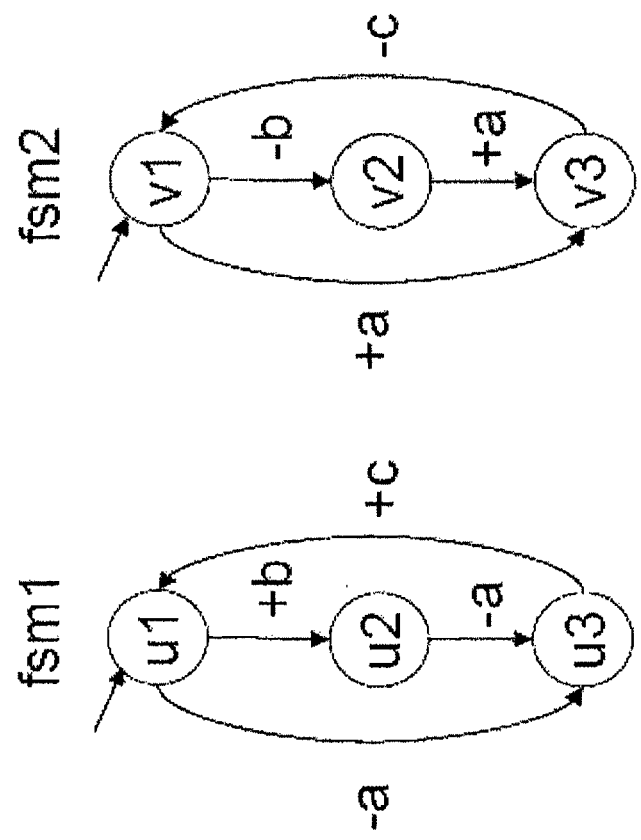
FIG. 2 is a diagram of example labeled directed graphs of two communicating finite-state machines.

For example, FIG. 2 is a diagram of example labeled directed graphs of two communicating finite-state machines fsm1 and fsm2. N=2, $S_1=\{u_1, u_2, u_3\}$, $S_2=\{v_1, v_2, v_3\}$, $S_1^0=u_1$, $s_2^0=V_1$, $M_{12}=\{a\}$, $M_{21}=\{b, c\}$, $\delta$ $(u_1, a)=u_3$, $\delta$ $(u_1, b)=u_2$, $\delta$ $(u_2, a)=U_3$, $\delta$ $(u_3, c)=U_1$, a $(v_1, a)=v_3$, d $(v_1, b)=v_2$, a $(V_2, a)=v_3$, $\delta$ $(V_3, c)=v_1$.

The finite-state machines communicate asynchronously via unbounded FIFO channels. According to an aspect of an embodiment, one channel might be required to be exclusively assigned to each type of message passed between a pair of finite-state machines, or any other combinations of channel-to-message assignment(s). Such a requirement makes the communication mechanism different from the communication mechanism discussed in D. Brand and P. Zafiropulo, "On communicating finite-state machines," J. ACM, 30(2):323-342, 1983, where only one full-duplex channel is assigned to each pair of finite-state machines.

For example, consider the CFSMs in FIG. 2. If fsm1 makes a transition from state $u_1$ to $u_3$ by sending message a, and fsm2 makes a transition from state $v_1$ to $v_2$ by sending message b, then fsm1 will be stuck at state $u_3$ according to conventional communication mechanism defined in D. Brand and P. Zafiropulo, "On communicating finite-state machines," J. ACM, 30(2):323-342, 1983. This is because the first message sent by fsm2 to fsm1 is b, and there is no transition from $u_3$ that will consume b. However, according to an aspect of an embodiment, three channels are provided or specified between fsm1 and fsm2, one for each message type a, b, and c. Hence, message b, sent by fsm2, will be in a separate FIFO compared to message c that it will send upon reception of message a from fsm1. This refers to fsm1 can receive message c ahead of message b, and make the transition from $u_3$ to $u_1$. A message type can by any abstract category of a message as defined by system specification/requirements. Messages in the same category would be given the same label. For example, a message "a" could represent a category called "request for service."

The CFSMs modification according to the embodiments makes the communication semantics of CFSMs consistent with that of message sequence charts. In other words, according to an aspect of an embodiment communication semantics of the CFSM are harmonized with the MSC by specifying a plurality of First-In-First-Out (FIFO) message channels among a plurality of CFSMs according to a message type. Messages of the same type that are exchanged between two entities should comply to FIFO order. The modification, on one hand, makes message overtaking, as a modeling feature of MSC, possible. On the other hand, it makes each message have a unique source and destination. This can have important implications or benefits as discussed later.

According to an aspect of an embodiment, there might not by any assumption on the amount of time that a machine spends in a state before sending a message, and a message spends in a channel before arriving at its destination.

2. Message Sequence Chart (MSC). A basic message sequence chart (bMSC) includes a set of concurrent processes, called instances, that communicate via messages whose temporal ordering is a partial order. Formally, define I to be a finite set of instances denoting the communicating entities. Let E be a set of events, partitioned into two sets S and R, where S is a set of sending events and R is a set of receiving events. There is a labeling function L: E→I that associates events to instances. Define M: S→R to be a bijection mapping that associates each sending event with a unique receiving event. Finally, let $<_i$ be a chain of events associated to an instance i in I. It corresponds to the visual order from top to bottom in which the events are displayed along the instance axis. A bMSC is then defined by the 5-tuple (I, E, L, M, $<_i$).

The transitive closure of $<_i$ together with the ordering induced from the send-receive bijection M, i.e. a sending event precedes the corresponding receiving event, defines a partial order of the events set E. An important consequence of asynchronous communication is that messages overtaking is allowed. In other words, it is possible that instance A first sends message m then message n to instance B, but instance B first receives n then m.

Figure 3:
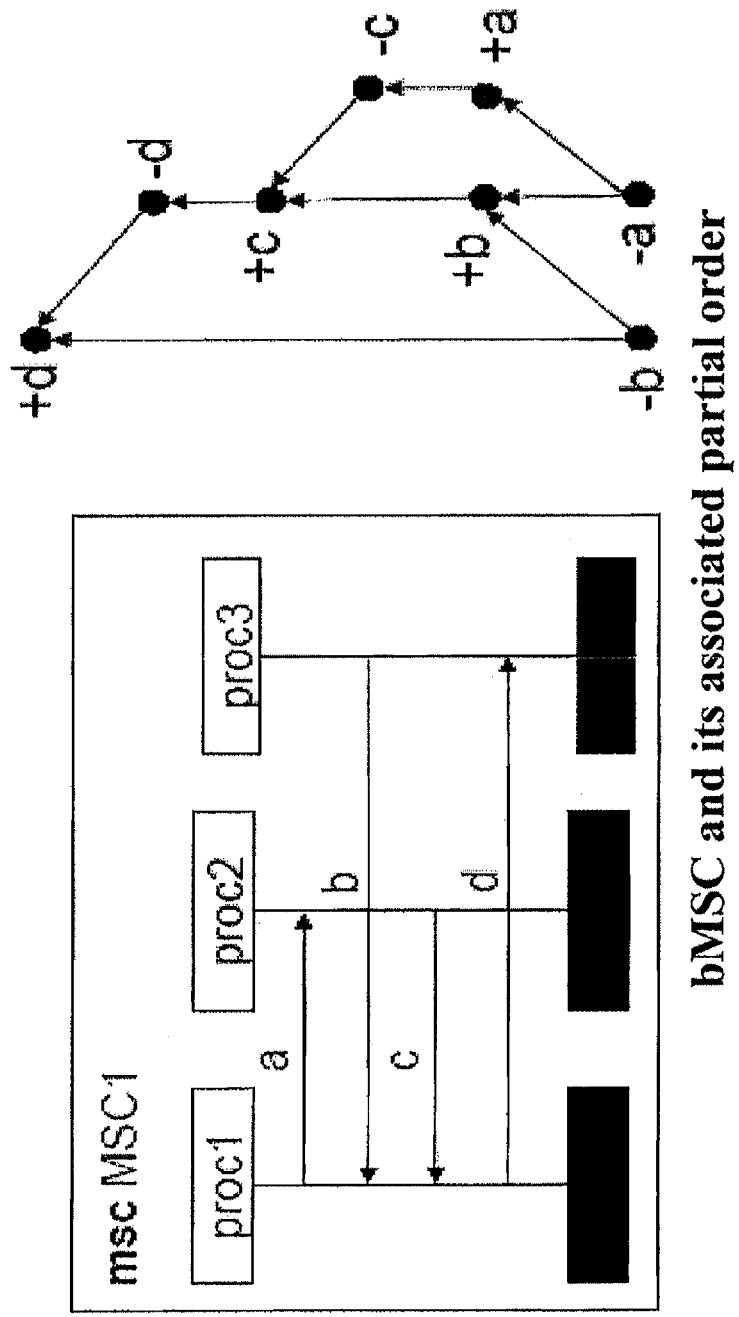
FIG. 3 is a diagram of an example bMSC and its associated partial order.

A bMSC can be graphically represented by a frame containing a collection of instances. FIG. 3 is a diagram of an example bMSC and its associated partial order. In FIG. 3, each instance comprises a single vertical axis connecting an empty rectangle representing a process as an instance head and a filled rectangle representing instance end. In FIG. 3, there are three processes 1, 2 and 3. Messages are represented by edges from a point on the sending instances axis to a point on the receiving instances axis. FIG. 3 also shows the communication order of the messages for MSC1 in a partial order graph.

Figure 4:
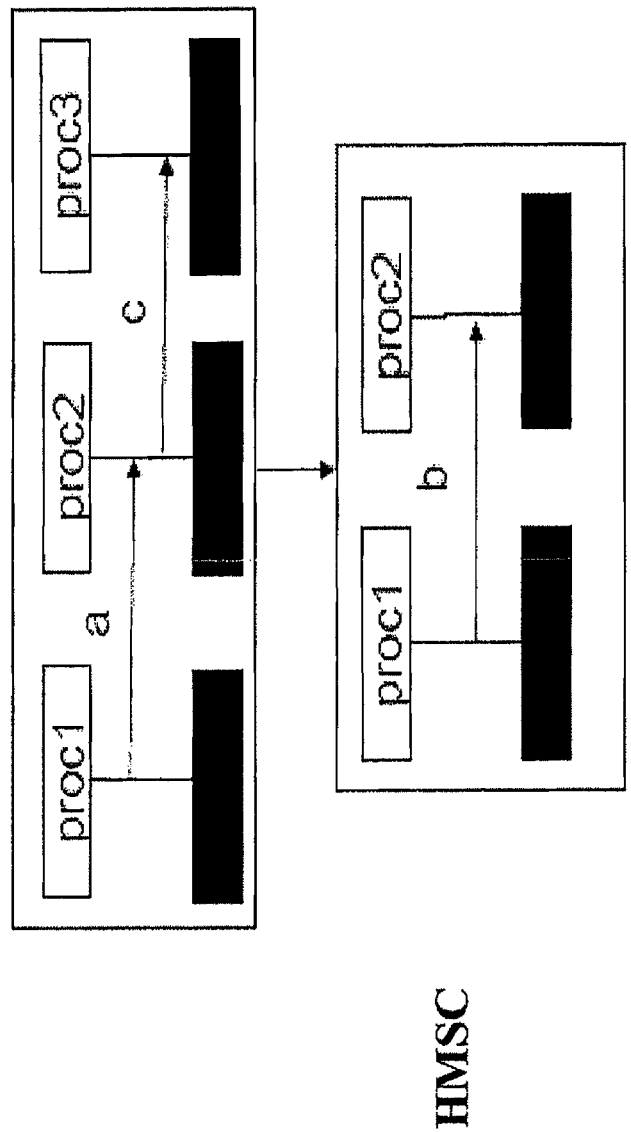
FIG. 4 is a diagram of an example hMSC.

FIG. 4 is a diagram of an example Hierarchical MSC (hMSC). Hierarchical MSC or high-level MSC (hMSC), which is discussed in "ITU-T recommendation Z-120, Message Sequence Chart (MSC)," ITU Telecommunication Standardization Sector, 2004, extends bMSC with a set of composition mechanisms: parallel composition, alternative composition, and sequential composition. A hMSC comprises a set of nodes with arrows indicating relations. An edge between two nodes implies they are composed vertically. Splitting of an edge indicates the successors are alternatives. A directed cycle denotes a repetition. The vertical or sequential composition of MSC are typically defined as the weak sequential (synchronous) composition or asynchronous composition. For example, consider the hMSC shown in FIG. 4. In asynchronous composition, process 1 can send a, and then send b even though process 2 has neither received a nor sent c yet, whereas in synchronous composition, process 1 could only send b after process 2 has sent c and process 3 has received it.

A compositional MSC (CMSC) differs from a bMSC in the following way. In a bMSC each sending event is paired with a receiving event in the bMSC and vice versa. In a CMSC, however, sending or receiving events could have no corresponding receiving or sending events, respectively.

Figure 5:
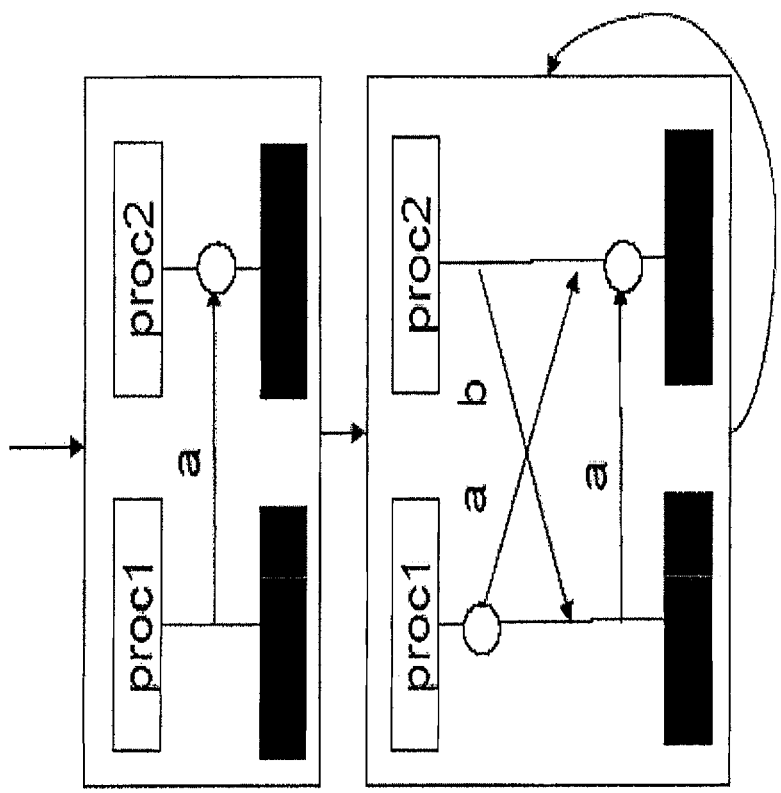
FIG. 5 shows an example HCMSC.

A high-level compositional MSC (HCMSC), which is discussed in E. L. Gunter, A. Muscholl, and D. Peled, "Compositional message sequence charts," In TACAS 2001: Proceedings of the 7th International Conference on Tools and Algorithms for the Construction and Analysis of Systems, pages 496-511, London, UK, 2001, Springer-Verlag, is a diagraph, where each node represents a CMSC and edges connecting nodes represent asynchronous compositions. The HCMSC can be introduced to deal with certain scenarios that can not be finitely represented by a bMSC or hMSC. FIG. 5 shows an example HCMSC. According to an aspect of an embodiment, an empty circle denotes the absence of an event.

Herein, an MSC refers to the general notion of message sequence charts, including bMSC, hMSC, CMSC, or HCMSC, or any combinations thereof.

3. Petri Net, A Petri net is a 4-tuple (P, T, F, $M_0$). P is a finite set of places. T is a finite set of transitions. F:(P×T)∪(T×P) →N is the flow relation. $M_0$:P→N is the initial marking. In general, M: P→N is a marking, which represents a state of a Petri net. N denotes the set of nonnegative integers. Let v∈P∪T. Its preset and postset are given by:

$$*v=\{u \in P \cup T | F(u,v)>0\}, v*=\{u \in P \cup T | F(v,u)>0\}$$

A Petri net is finitely preceded if for every v∈P∪T,*v is finite.

Figure 6A:
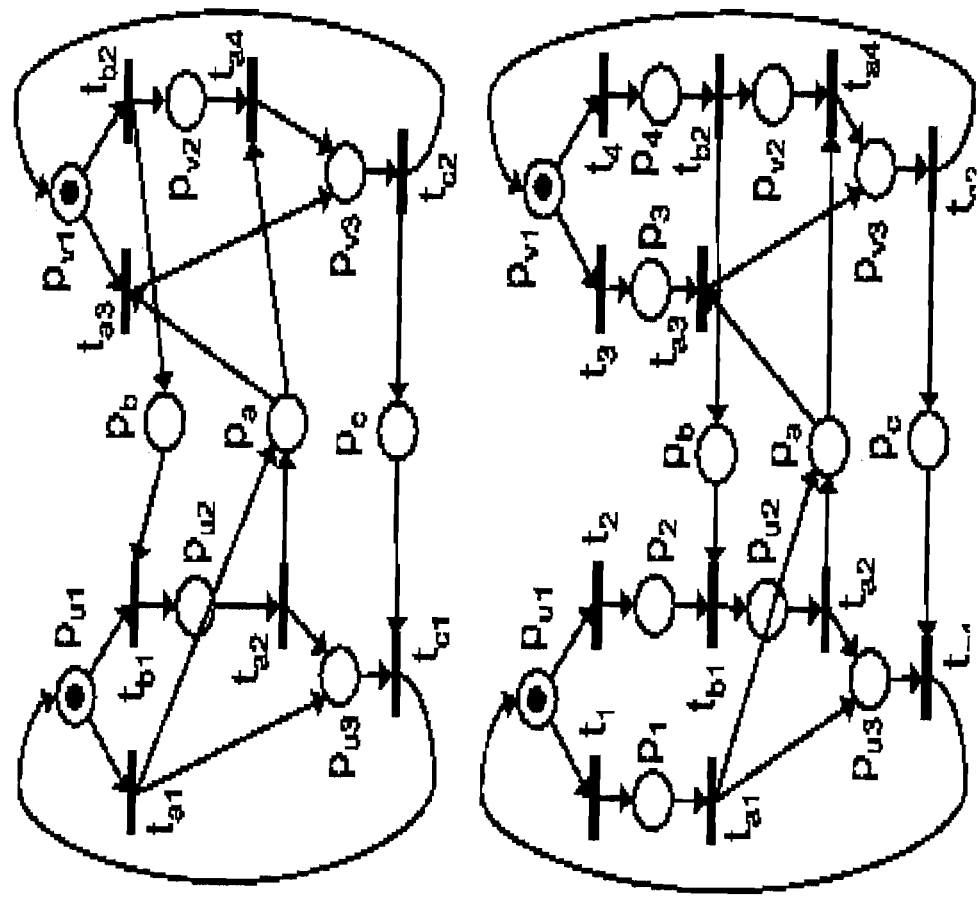
FIG. 6A is a diagram of example Petri nets corresponding to CFSMs.

FIG. 6A is a diagram of Petri nets corresponding to CFSMs. A Petri net can be represented by a directed, weighted, bipartite graph as shown in FIG. 6A, in which circles denote places, bars denote transitions, and directed arcs denote the flow relation. A marking is represented by an assignment of black dots in places. A Petri net is acyclic if the underlying graph is acyclic.

A transition t is enabled at a given marking M, if M(p)≥F (p,t) for all place p∈P. When a transition is enabled it can fire. The new marking M' reached after the firing of t is defined as: M'(p)=M(p)−F(p,t)+F(t,p) for all place p∈P.

The incidence matrix $A=|a_{ij}|$ is a |T|×|P| matrix, where $a_{ij}=F(t_i, p_j)-F(p_j, t_i)$. If a marking M' is reachable from M through a firing sequence a then $M'=M+A^T \overline{\sigma}$. The firing count vector $\overline{\sigma}$ is a |T|-vector, where the i-th entry denotes the number of times transition $t_i$ fired in σ. A T-invariant is a nonnegative integer solution to $A^T x=0$. A |T|-vector x is a T-invariant if and only if there exists a marking M and a firing sequence a from M back to M with $\overline{\sigma}=x$. A T-invariant x is minimal if there exists no T-invariant x≠0 with x'<x.

Two distinct transitions t and t' are in a conflict relation, if *t∪*t≠0. Two distinct transitions t and t' are in a free choice relation, if for each place p∈*t∪*t and for each transition t"∈p*,F(p,t)=F(p,t')=F(p,t"). An occurrence net is a acyclic, finitely preceded Petri net such that for all places p∈P, |*p|≤1 and |p*|≤1. Intuitively, occurrence nets are cycle-free and conflict-free Petri nets. Occurrence nets naturally represent a partial ordering of the events associated with Petri net transitions.

4. Synthesis of MSC from CFSM. According to an aspect of an embodiment, a partial ordering of events is represented by MSCs and occurrence nets. Given one representation, the other may be derived directly from the structure. A structural transformation from bMSCs to occurrence nets has been studied in P. Graubmann, E. Rudolph, and J. Grabowski, "Towards a Petri Net Based Semantics Definition for Message," In SDL '93—Using Objects (Editors: O. Faergemand, A. Sarma), North-Holland, October 1993, October 1993. However, the embodiments do not explicitly generate an occurrence net and then transform it to a MSC. Instead, according to an aspect of an embodiment, after a set of chains of events are obtained as a linearization in 142, at 144, each chain of events (linearization) is mapped to a process line in a MSC. An embodiment also transforms CFSMs to a Petri net by explicitly representing the communication channels with places. Although Petri net places might not preserve the FIFO ordering, the execution semantics is not affected as tokens are not distinguished. The FIFO ordering can be reconstructed when events are matched in the finial MSC generation.

According to an aspect of an embodiment, for example, it might not be assumed the CFSMs have a finite number of states. In other words, the communication channels could have unbounded capacity. Unboundedness can be a desired abstraction of high-level models of telecommunication systems. In fact, MSCs can model infinite-state systems. According to an aspect of an embodiment, the channel capacity might be constrained only when a finite HCMSC representation can not be obtained otherwise.

Transformation of CFSMs to a Petri Net at 140 will be described according to Pseudo Code 1:

Pseudo code 1

Figure 6B:
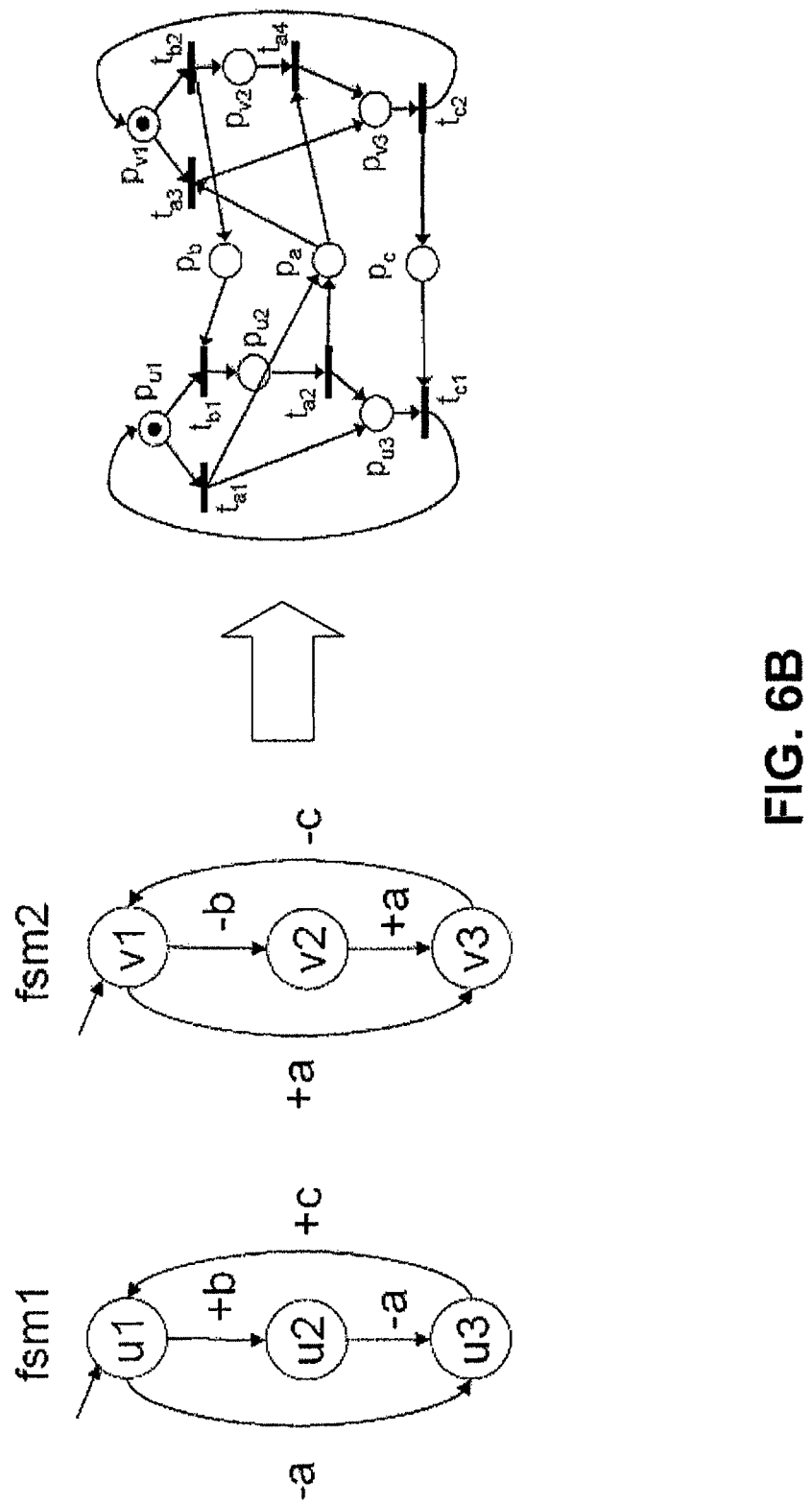
FIG. 6B is a diagram of example CFSM transformation into a Petri net.
Figure 6C:
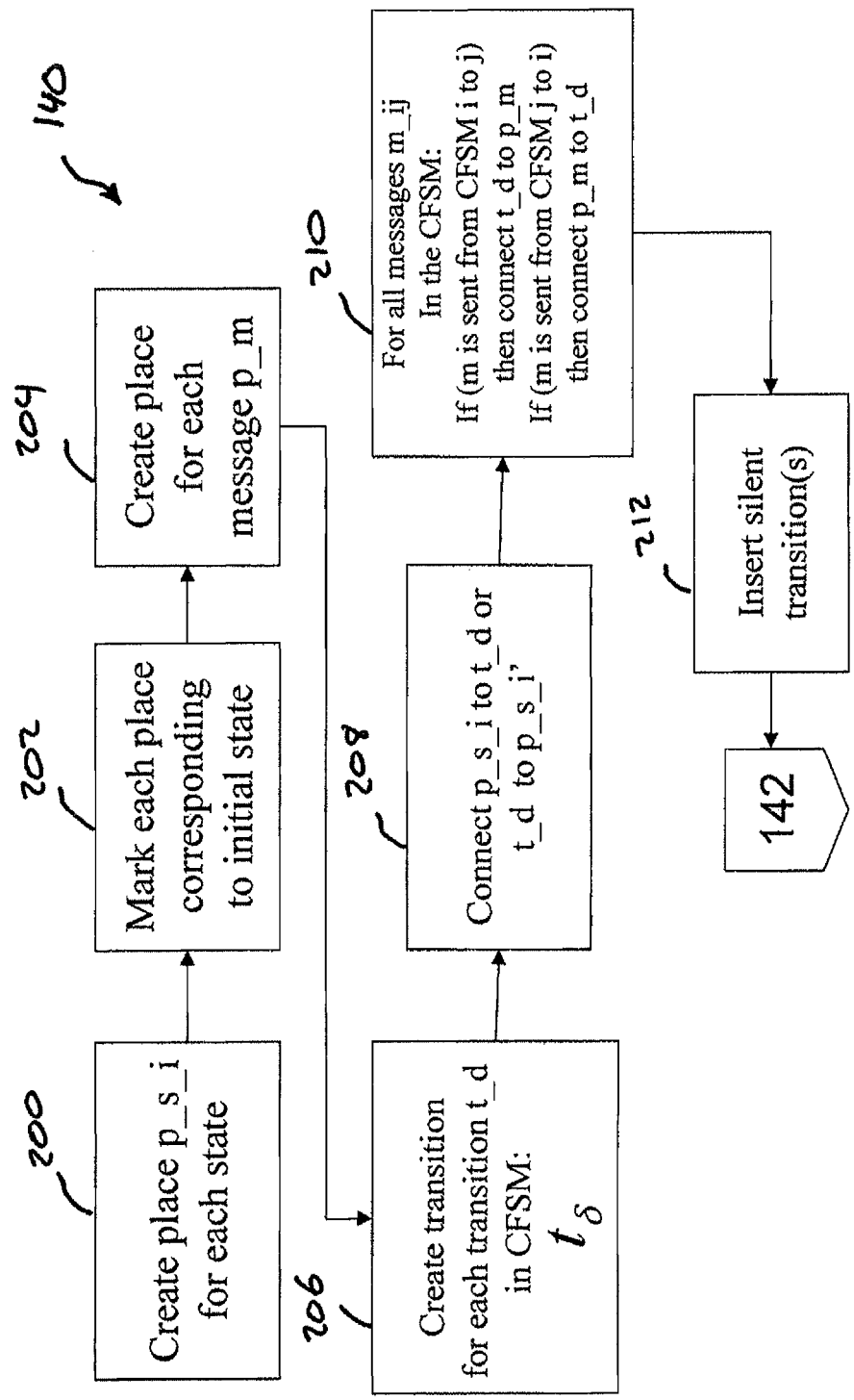
FIG. 6C is a flowchart of transforming a CFSM to a Petri net.

INPUT: a set of CFSMs $\langle \{S_i\}_{i=1}^{N} \{s_i\}_{i=1}^{N} \{M_{ij}\}_{i,j=1}^{N}, \delta \rangle$.
OUTPUT: a Petri net (P, T, F, $M_0$).
  P=T=0
  for all state $s_i \in \{S_i\}_{i=1}^{N}$ do
    P ∪ $p_{s_i}$.
    if $s_i = s_i^0$ then
      $M_0(p_{s_i}) = 1$
    end if
  end for
  for all message m ∈ $\{M_{ij}\}_{i,j=1}^{N}$ do
    P ∪ $p_m$
  end for
  for all mapping $\delta : (s_i, m) \rightarrow s_i'$ do
    T ∪ $t_\delta$
    $F(p_{s_i}, t_\delta) = 1, F(t_\delta, p_{s_i'}) = 1$
    if m ∈ $M_{ij}$ then
      $F(t_\delta, p_m) = 1$
    end if
    if m ∈ $M_{ji}$ then
      $F(p_m, t_\delta) = 1$
    end if
  end for For example, FIG. 6A shows the Petri net (the top) transformed from the CFSMs in FIG. 2 after applying the Pseudo Code 1. FIG. 6B is a diagram of the CFSM transformation into the top Petri net in FIG. 6A. FIG. 6C is a flowchart of 140 transforming a CFSM to a Petri net. At 106 (FIG. 1A), the synthesis starts at 140 (FIG. 1B) with a transformation from CFSMs to a Petri net. As illustrated by Pseudo Code 1 and in FIG. 6C, at 200, the transformation first maps states of each FSM to places of a Petri net. At 202, if a state is an initial state, its corresponding place is marked. Then, at 204, communication channels are explicitly modeled as places. One place $p_m$ is created for each message m exchanged between a pair of FSMs. At 206, a state transition from a state s to s' in a FSM is created. At 208, the state transitions are modeled by Petri net transition t with *t={$p_s$}, t={$p_{s'}$}, where $p_s$, $p_{s'}$, model the two states s, s', respectively. In other words, at 208, Petri net places created at 204 are connected to the transitions created at 206. At 210, depending on whether the transition is triggered by transmission or reception of message m, a directed edge from t to $p_m$ or from $p_m$ to t is created, respectively.

It is possible that there exist more than one output transition of a place modeling a channel. However, this will not introduce conflict, as at any given state only one of the output transitions is enabled. For example, in FIG. 6A, Petri net (the top) and in FIG. 6B the place modeling the communication channel of message a has two output transitions. It can be shown that at any reachable state only one of the transitions is enabled. This is because only one place in {$p_{v1}$, $p_{v2}$, $p_{v3}$} is marked at any reachable state. Recall that each place in the set (Petri net) corresponds to a state of the original finite-state machine.

It could be difficult to structurally distinguish the transitions that model alternatives and choices from the output transitions of a channel place. For example, theoretically, they are all transitions in structural conflict. After a Petri net directly mapped from CFSMs is obtained, at 212, silent transitions are inserted to model alternative state transitions as non-deterministic free choices. These transitions are called silent, because they are not associated with communication events in the original CFSM, enabling free choice relationships when there are alternative transitions to be fired. For example, in FIG. 2 state u1 in fsm1 has two possible transitions to u2 and u3. One is triggered by a sending event −a and the other is triggered by a receiving event +b. Thus, in FIG. 6A (bottom Petri net) two decision silent transitions $t_1$ and $t_2$ and correspondingly two places $P_1$ and $P_2$ are inserted. FIG. 6A shows the Petri net (the bottom) obtained after inserting the silent transitions. It is easy to see that the two transitions modeling the alternative state transitions are in a free choice relation, i.e. $*t_1 = *t_2 = p_{u1}$, $F(p_{u1}, t_1) = F(p_{u1}, t_2)$. However, the embodiments are not limited to inserting silent transitions after obtaining the Petri net, but the insertion can occur at other times, for example, during the obtaining of the Petri net.

The free choice modeling allows a finite-state machine to commit to a transition triggered by a receiving event even when the message has not arrived yet. This implies that the modeled finite-state machine can not test for the arrival of a message before deciding whether to take a transition. This implies that the CFSMs communicate using blocking read, non-blocking write semantics. Given that messages have a single source and single destination, the Petri net derived from these CFSMs by the Pseudo Code 1, can meet a Kahn Process Network (KPN) discussed in G. Kahn, "The semantics of a simple language for parallel programming," In Information processing, pages 471-475, August 1974; and in G. Kahn and D. B. MacQueen, "Coroutines and networks of parallel processes," In Information processing, pages 993-998, August 1977. Based on the KPN theory, the sequence of messages exchanged between FSMs will not change with different execution orders of the CFSMs. This theoretical result ensures the correctness of the next synthesis by the Pseudo Code 2 based upon the Petri net derived by the Pseudo Code 1.

According to an aspect of an embodiment, at 142, a particular execution of the Petri Net that has a compact representation (also referred to as an occurrence net) is selected, and this will lead to a compact HCMSC. The sequence of messages appearing in channels will not be affected by which execution order is chosen. In other words, all executions can yield equivalent HCMSCs. Therefore, the embodiments can generate a compact HCMSC. Directly synthesizing occurrence nets from a Petri net can often be a difficult task, but it is not necessary, because the embodiments use linearizations of partially-ordered events to obtain a compact representation, and allow a post-processing to recover the partial-ordering (occurrence net).

Figure 7A:
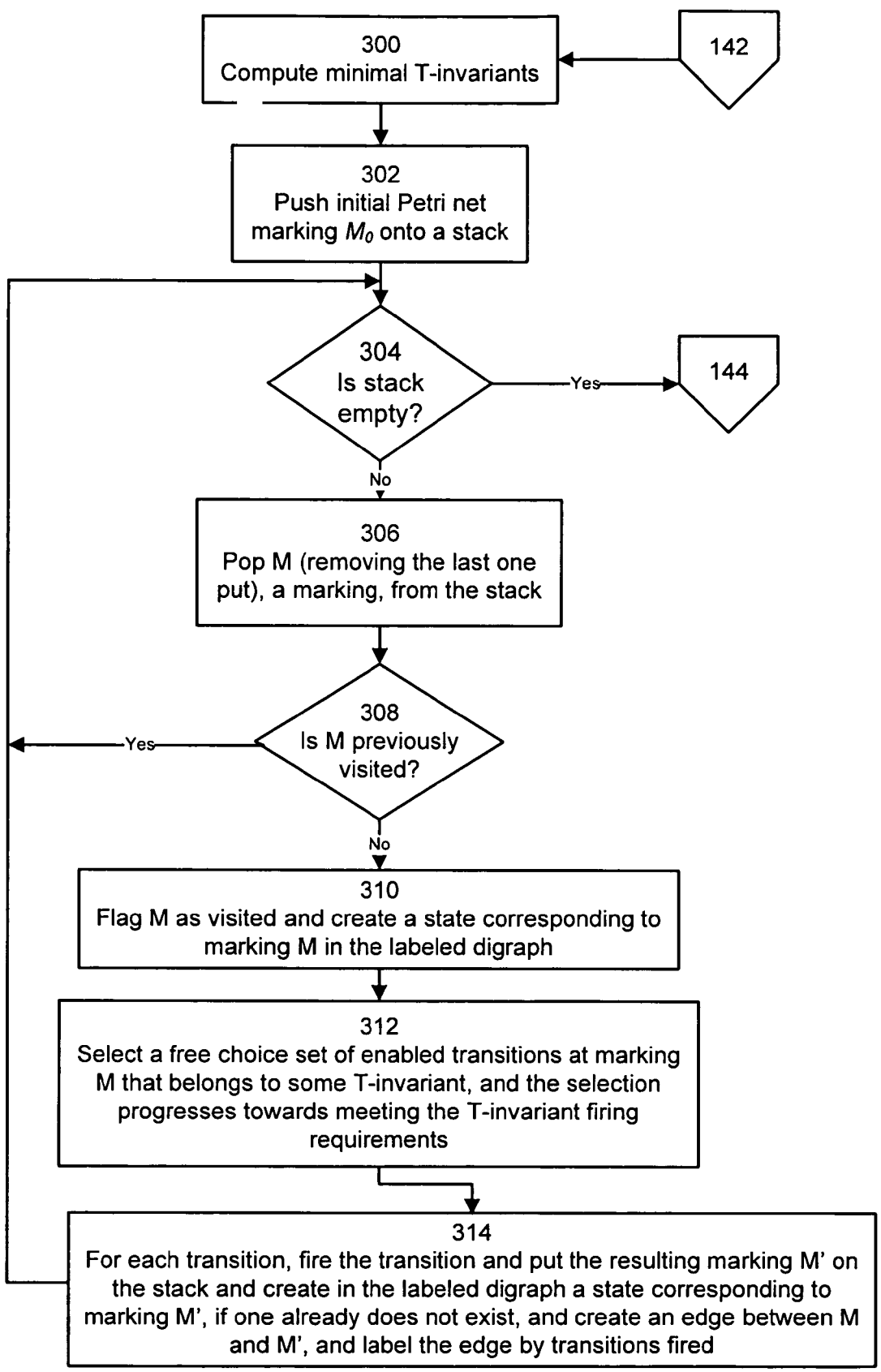
FIG. 7A is a flow chart of generating a labeled finite digraph based upon linearization of Petri net occurrence nets.

FIG. 7A is a flowchart of generating a labeled finite digraph based upon linearization of Petri net occurrence nets. In particular, in FIG. 7A, events are linearized, allowing at 146 projecting the events to process axes of an MSC, based upon obtaining a set of chains of events as the linearization of the events. Further, in FIG. 7A, for example, repeatedly a single linearization from many alternatives is searched, based upon a minimum linearization time, for example, according to a minimum T-invariant. In FIG. 7A, at 300, minimal T-invariant is computed. At 302, an initial Petri net marking $M_0$ is pushed onto a stack. At operation 304, it is determined whether the stack is empty. If, at 304, the operation proceeds to 144. If, at 304, the stack is not empty, M marking is popped from the stack and, at 308, it is determined whether M has been previously visited. If, at 308, M has been previously visited, the operation proceeds to the next marking on the stack. If, at 308, the M marking has not been previously visited, at 310, the M marking is flagged as visited and state corresponding to making M is created in a labeled digraph. At 312, a free choice set of enabled transitions at marking M that belongs to some T-invariant, the firing of which progresses towards meeting the T-invariant firing requirements is selected. At 314, for each transition, the transition is fired and the resulting marking M' is put on the stack, and in the labeled digraph a state corresponding to marking M' is created, if one already does not exist, and an edge between M and M' is created and the edge is labeled with the transitions fired. The operations 304 through 314 are repeated searching for one or more sets of chains of events as the linearization of the events in the Petri net, until all Petri net markings M within the T-invariant are visited. Selecting one (single) linearization refers to whenever there is a choice of transitions to be explored, only one path guided by the T-invariant is explored. In other words, instead of just looking at all permutations and combinations of transition sequences, one path that represents one particular interleaving of events along that path is explored. Thereafter, other subsequent paths (other subsequent subsets of events) are also similarly explored (i.e., whenever there is a free choice set of transitions, only one is selected) that correspond to different subsets of events, such that the embodiments provide for each free choice set of transitions, repeatedly selecting only one (a single) transition to be fired. Basically, for any subset of events, there is a partial ordering, which can lead to many linearizations, but only one is explored, because the others can be deduced from the one selected. For other subsequent subsets of event, by selecting one transition whenever there is a free choice set of transitions, other linearization are similarly generated. All of these linearizations are represented in the labeled digraph. But this set of linearizations for this subsets of events is still far smaller than all "possible" linearizations that could have been generated from each (all possible) subset(s) of events. Other paths are also similarly explored that correspond to different sets of events. A benefit is to control unfolding of the Petri net that can be otherwise infinite.

A set of partially ordered events could have a large number of possible linearizations. However, the embodiments in FIG. 7A recover the partial ordering of the Petri net from a linearization of events as a set of chain of events and, at 146, project the events in the linearization to process axes of an MSC. The causality between events associated with different chains can be induced from the send-receive bijection. Thus, any linearization could be chosen as a representative of the partial ordered events.

Figure 7B:
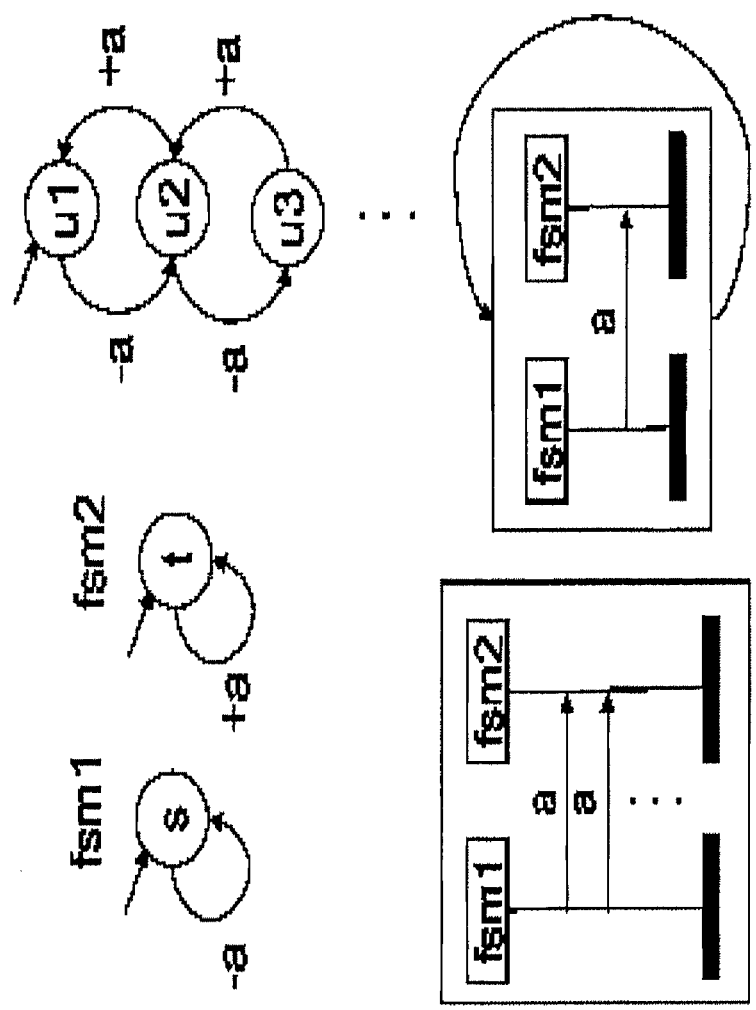
FIG. 7B is a diagram of possible MSCs representing the CFSMs according to linearization alternatives.

In FIG. 7A, the choice of linearization can impact the size of underlying representation. FIG. 7B is a diagram of possible MSCs representing the CFSMs according to linearization alternatives. For example, FIG. 7B is a diagram of two CFSMs fsm1 and fsm2, their product machine, and two possible MSCs representing the CFSMs. Note that since the CFSMs communicate asynchronously via unbounded channels, the product machine has an infinite number of states. The left MSC is derived from the linearization −a, . . . , −a, +a, . . . , +a, while the right MSC is derived from the linearization −a, +a, . . . , −a, +a. Obviously, the right MSC has a more compact representation. Thus, choosing a linearization that exhibits repeated patterns as soon as possible is desirable. Therefore, according to an aspect of an embodiment, minimal sets of events that lead to the initial state of the product FSM are identified; in other words, minimal length cycles. Then, the state space search for this branch could be terminated, because the suffix sequences are simply repetition of the existing sequences. This cycle-guided search relies on the concept of T-invariant of a Petri net, which is discussed in T. Murata, "Petri nets: properties, analysis, and applications," Proceedings of the IEEE, 77(4):541-580, April 1989. A T-invariant is a non-negative firing counting vector, where each entry indicates the number of firings of the corresponding transition. It is known that the firing counting vector of any cyclic firing sequence is a T-invariant. A minimal T-invariant is a T-invariant whose firing counting vector is not less than that of any other T-invariant. During the state space search, the embodiments consistently choose to fire the set of transitions that comprises a minimal T-invariant.

The embodiments take advantage of the knowledge of underlying CFSMs. Each message has a unique sender and receiver. This implies that the system behavior diverges only when a finite-state machine makes a transition among alternatives. These alternatives are modeled by free choices. Thus, for example, all transitions in a free choice set are explored, and the complete set of scenarios can be obtained. It is worth noticing that at a state any enabled transition can be chosen to fire. Compared with partial-ordered reduction techniques, this adds more flexibility during a state space search. If the transition chosen to fire belongs to a free-choice set, then all other transitions in the set have to be explored. This guarantees that the completeness of the generated scenarios. It also guarantees that any two branches in the labeled digraph will not correspond to different interleavings of the same MSC. So each branch (that creates a path) in the labeled digraph corresponds to a different interleaving, such that instead of looking at "all possible" interleavings, according to an aspect of an embodiment only one (single) interleaving is crated for one subset of events. This is because transitions in a free choice set model decisions to choose different alternative transitions of a FSM. In other words, any two subsequent scenarios differ by their top event. More particularly, at 142 (FIG. 7A), selecting a partial ordered execution of the Petri net can be described according to Pseudo Code 2:

---
Pseudo Code 2
---
INPUT: a Petri net (P, T, F, $M_0$).
OUTPUT: a partially ordered execution.
    Stack= 0
    VisitedMkg = 0
    push($M_0$) onto Stack
    while Stack ≠ 0 and no termination do
        pop(M) from Stack
        if M ∉ VisitedMkg then
            VisitedMkg = VisitedMkg U M
            S = enabledFCS(M)
            for all t ∈ S do
                M' = succ(M, t)
                push(M') onto Stack
            end for
        end if
    end while

---

As illustrated in Pseudo Code 2, the partial ordered-execution of a Petri net transformed from CFSMs is a cycle-guided depth-first search. Practically, it creates a diagraph with each node representing a state that was previously visited. At a state one enabled free choice set is chosen to fire. Note that a non-conflicting transition can be viewed as a special case of a free choice set (with one element). Among enabled transitions, one is chosen based on the heuristic to search for minimal cycles. Terminating a branch with a cycle may not be always successful. Certain branches could lead to deadlock or infinite accumulation of tokens. According to an aspect of an embodiment, once either case is identified, the corresponding branch search is terminated and labeled with an exit. The labeled digraph actually comprises the interleavings of partial ordered events, which is referred to as a representative graph of occurrence nets of the Petri net obtained at 140.

Figure 8:
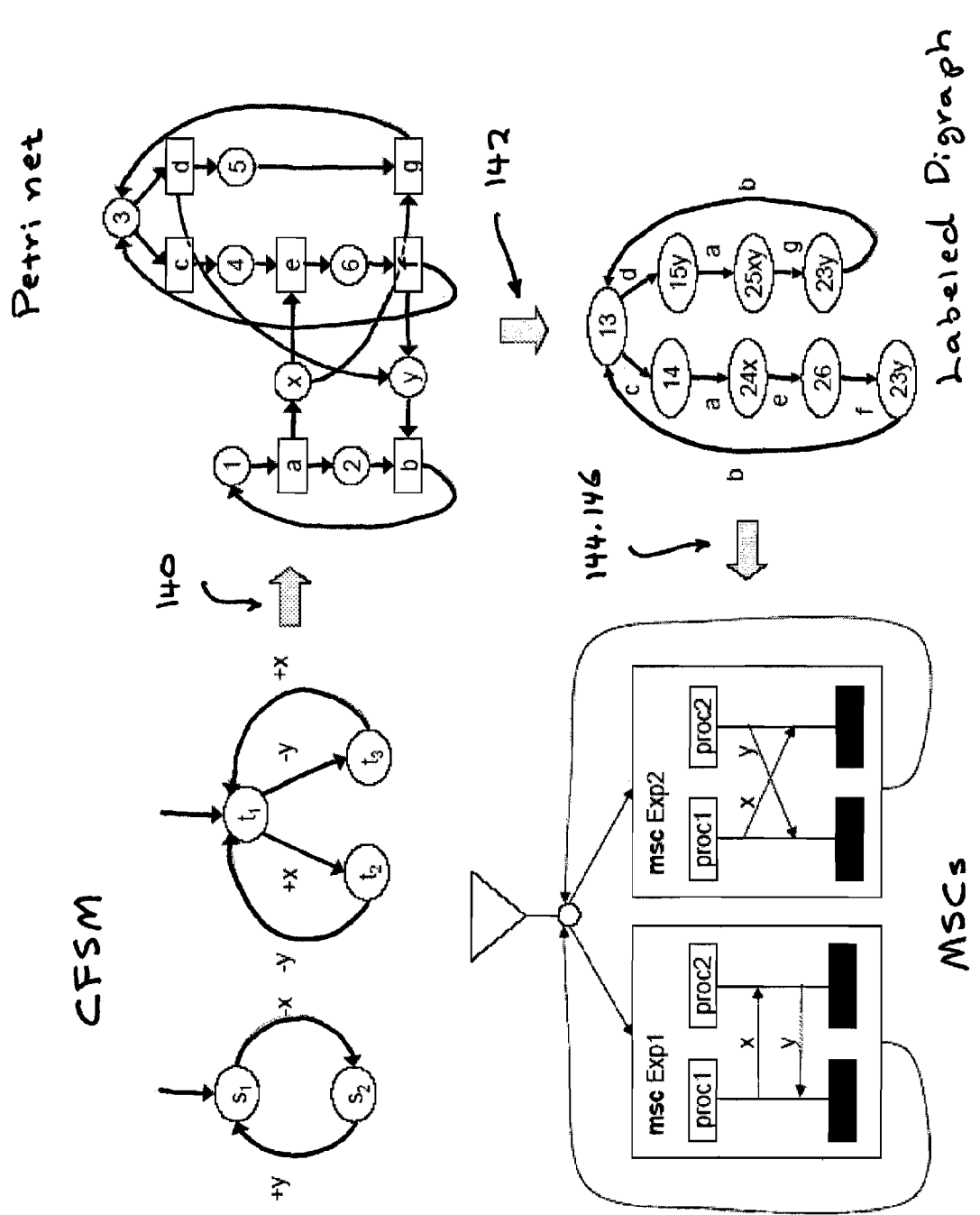
FIG. 8 is a diagram of synthesizing an MSC from a CFSM.

FIG. 8 is a diagram of synthesizing an MSC from a CFSM. For example, FIG. 8 illustrates the synthesis flow. In particular, by referring to FIG. 8, the partial ordered execution is described using an example. Given the Petri net transformed from the CFSMs, at 140, at 142, one can compute two minimal T-invariants, whose supports are {c, a, e, f, b}, {d, a, g, b}, respectively. Starting from the initial state $M_0$, where places 1, 3 are marked, a depth-first-search is performed. Note that there are two free choice sets {c, d}, {a} enabled at $M_0$. For example, only one is chosen to be processed. Suppose {c, d} is chosen, and transition c is processed first. Then the subsequent search will try to pick an enabled transition whose support is in the minimal T-invariant {c, a, e, f, b}. Similarly, when transition d is processed, the minimal T-invariant {d, a, g, b} will be chosen as a "guide." In this example, the depth-first-search terminated successfully by reaching a state that was previously visited.

After, at 142, a representative graph is obtained, at 144, the graph is segmented into sequences such that each segment could be mapped to a CMSC and a HCMSC could be constructed by a composition of the CMSCs. The segmentation is done through one traversal of the representative graph. Sequence of transitions are broken at nodes which have more than one incoming edges or outgoing edges. The former represents an iteration, and the latter represents a choice. Then, at 146, for each segment of sequence, the communication events modeled by the transitions are projected onto corresponding instance axes of a CMSC.

For example, at 146, the representative graph in FIG. 8 is mapped to two CMSCs, one for each branch. The left branch, sequence (c, a, e, f, b) is mapped to the series of events (−x, +x, −y, +y). Note that transition c is a silent transition. It models a decision and does not have a corresponding communication event. Events −x, +y are associated with the left finite-state machine, thus are mapped to the process line proc1. Events +x, −y are associated with the right finite-state machine, and are mapped to the process line proc2. Note that there are no unmatched events in this example. Therefore, edges connecting corresponding communicating events are created. Since the sequence of events return the system to its initial state, a back edge to initial node is created. Similarly the CMSC Exp2 can be constructed with the right branch.

Note that if there exists unmatched events in a CMSC, special attention is paid to matching events in the subsequent CMSC. This is because it is possible that a receiving event in a CMSC actually matches with a sending event in a previous CMSC, instead of a sending event within the same CMSC. This is because the two sending events must comply with the FIFO ordering. For example, in FIG. 5, the sending and receiving event of message a in the bottom CMSC cannot be matched.

According to an aspect of an embodiment, synthesizer can be implemented in computing hardware and/or software, for example (without limitation) in C programming language as an extension of a synthesis package QSS discussed in J. Cortadella, A. Kondratyev, L. Lavagno, C. Passerone, and Y Watanabe, "Quasi-static scheduling of independent tasks for reactive systems," IEEE Transactions on Computer-Aided Design, 24(10):1492-1514, 2005. The inventive synthesizer takes as input a set of communicating sequential programs describing the CFSMs. Each sequential program describes the state transitions of a finite-state machine as a result of certain communication events. The program could contain conditional branches, which model the local decisions. The inventive synthesizer generates a HCMSC in any format, for example, a format that is recognized by Scenery discussed in R Murthy, S. Rajan, and K. Takayama, "High level hardware validation using hierarchical message sequence charts," In IEEE High-Level Design, Validation and Test Workshop, pages 167-172, 2004, which has a graphical user interface (GUI). Further, the inventive synthesizer can report abnormal terminations, such as deadlock or unboundedness, and gives the traces in form of a HCMSC that lead to them.

Table 1 presents the statistics of example experiments performed on a 3.06 GHz Intel Xeon CPU with 512 KB cache and 3.5 GB memory.

TABLE 1

Statistics of synthesis HCMSC from CFSM

| | CFSM | | | HCMSC | | |
|---|---|---|---|---|---|---|
| | FSM | State | Trans | Msg | CMSC | edge | runtime |
| Xproto | 3 | 13 | 19 | 8 | 386 | 384 | .5 s |
| Boilctr | 4 | 12 | 15 | 6 | 74 | 106 | 70 ms |
| Libsys | 2 | 6 | 10 | 4 | 7 | 8 | <1 ms |

The first example models a protocol specification (a communication protocol specifying rules by which two systems communicate) described in A. Ito, H. Saito, F Nitta, and Y. Kakuda, "Transformation technique between specification in sd1 and specification in message sequence charts for designing protocol specifications," In ICC'92 IEEE International Conference on Communications, pages 442-447, 1992. The second example models a boiler control system described in S. Uchitel, J. Kramer, and J. Magee, "Incremental elaboration of scenario-based specifications and behavior models using implied scenarios," ACM Trans. Softw. Eng. Methodol., 13(1):37-85, 2004. The last example models a library access control system described in D. Brand and P. Zafiropulo, "On communicating finite-state machines," J. ACM, 30(2):323-342, 1983. Note that the number of CMSC counts all instantiations. The relatively large number of CMSC nodes and edges are due to the fact that there exist a large number of conditional transitions in the CFSMs.

The transformation from CFSMs to Petri nets is simply a structural transformation, thus can be done in linear time of the number of edges and states in the CFSMs. However, the partial ordered execution may take time exponential of the number of branches in CFSMs. This might be due to fact all transitions in a free choice set might be explored. Recall that this might be necessary, because different transitions in a free choice set correspond to different top events in the subsequent scenarios.

The described inventive synthesis generates a HCMSC from a network of communicating finite-state machines. The method is based on a synthesis of Petri net representation of CFSMs. According to an aspect of an embodiment; the inventive concept is use of Petri net structural theory and knowledge of underlying CFSM semantics to efficiently construct a succinct representation of the occurrence nets. An occurrent net basically represents a partial ordering which can be easily transformed into a MSC. The modeling of alternative transitions at a state of a FSM by non-deterministic free choices could introduce subtle semantics difference between the original CFSMs and the Petri net. It could cause artificial deadlocks of the Petri net. However, this should not add significant computation efforts. For example, typically an artificial deadlock is reached immediately after a non-deterministic choice.

The existence of unmatched events in a CMSC can make the HCMSC more difficult to read and understand than HMSC. However, many unmatched events could be eliminated. According to an aspect of an embodiment, the inventive concept is application of the concept of retiming in logic synthesis, in which unmatched events could be moved from the incoming edges of a node to its outgoing edges, or vice versa. This movement of unmatched events may render most CMSCs as bMSCs, and reduce the number of CMSCs (having unmatched events) considerably.

An aspect of the invention provides synthesizing a message sequence chart (MSC) (one or more MSCs) from a communicating finite-state machine (CFSM) (one or more CFSMs as a network of CFSMs), comprising transforming the CFSM to a Petri net model; generating a labeled finite digraph with each path representing a linearization of an occurrence net segment of the Petri net; decomposing the diagraph into segments; mapping each segment to a compositional MSC; and outputting the compositional MSC. According to an aspect of the invention, the embodiments can be used in any design or programming environment that uses visual notation for specifying design using MSCs (sequence diagrams) and FSMs (CFSMs, state charts, . . . ), or whenever there is a need for transforming the FSM model to an MSC model. According to an aspect of the invention, a programming environment can represent design using FSMs and MSCs in an iterative behavior preserving manner.

Figure 9:
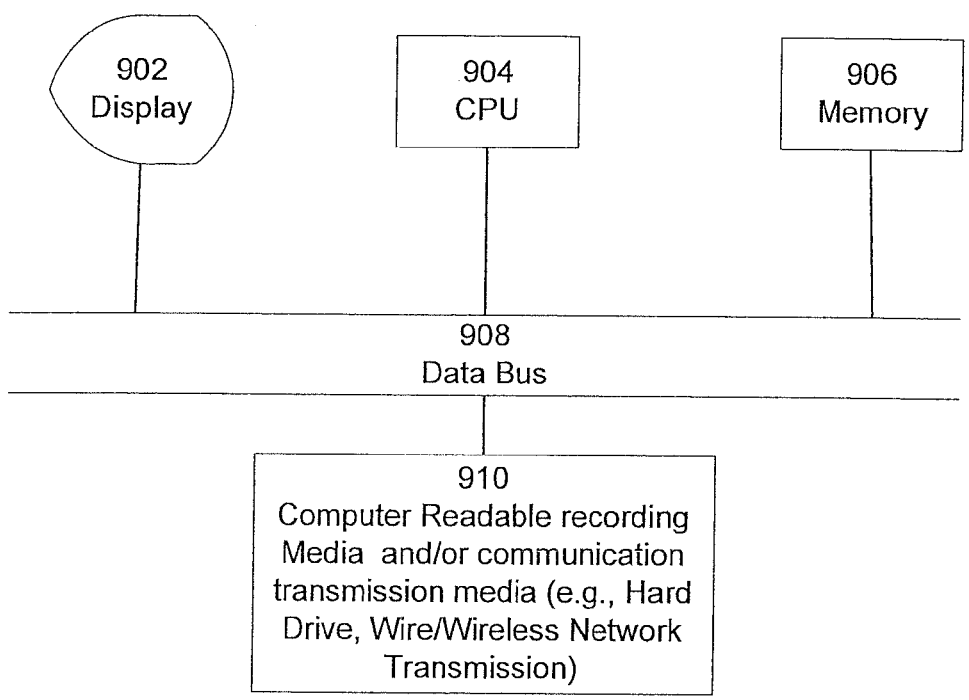
FIG. 9 is a diagram of an apparatus synthesizing an MSC from a CFSM.

Any combinations of the described features, functions and/or operations can be provided. The embodiments can be implemented in computing hardware (computing apparatus) and/or software, such as (in an unlimiting example) any computer that can store, retrieve, process and/or output data and/or communicate with other computers. FIG. 9 is a diagram of an apparatus synthesizing an MSC from a CFSM, according to an embodiment. In FIG. 9, the apparatus can be any computing device, for example, a personal computer. Typically, the apparatus includes a display 902 to display a user interface. A controller 904 (e.g., a central processing unit) executes instructions (e.g., a computer program or software) that control the apparatus to perform operations. Typically, a memory 906 stores the instructions for execution by the controller 904. According to an aspect of an embodiment, the apparatus reads/processes any computer readable recording media and/or communication transmission media 910. The display 902, the CPU 904, the memory 604 and the computer readable media 910 are in communication by the data bus 908. The synthesis results produced can be displayed on a display of the computing hardware. A program/software implementing the embodiments may be recorded on computer readable media comprising computer-readable recording media. The program/software implementing the embodiments may also be transmitted over a transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Examples of transmission communication media include a carrier-wave signal, an optical signal, etc. Further, according to an aspect of the embodiments, any combinations of the described features, functions and/or operations, including benefits thereof, can be provided and/or achieved.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope thereof.

What is claimed is:

1. A method of synthesizing a message sequence chart (MSC) from a communicating finite-state machine (CFSM), comprising:
    transforming the CFSM to a Petri net model;
    executing by a computer processor to generate a labeled finite digraph with each path representing a chain of events as a linearization of an occurrence net segment of the Petri net;
    decomposing the labeled finite digraph derived from the CFSM into segments; and
    mapping each decomposed segment of the labeled finite digraph derived from the CFSM to respective MSCs for output of a compositional MSC based upon the mapped to MSCs.

2. The method according to claim 1, further comprising harmonizing communication semantics of the CFSM with the MSC by specifying a plurality of First-In-First-Out (FIFO) message channels among a plurality of CFSMs according to a message type.

3. The method according to claim 1, wherein the transforming of the CFSM to the Petri net model comprises:
    mapping each state of the CFSM states to a place of the Petri net;
    marking each place corresponding to initial states from among the CFSM states;
    modeling the message channels as places of the Petri net; and
    modeling alternative state transitions as non-deterministic choices by inserting a silent transition,
    wherein the generating of the labeled finite digraph comprises searching states of the Petri net according to a firing of a transition in a free choice set of transitions to obtain a sequence of transitions as the chain of events for the linearization of an occurrence net segment of the Petri net.

4. The method according to claim 1, wherein the generating of the labeled finite digraph comprises searching states of the Petri net according to a firing of a transition in a free choice set of transitions to obtain a sequence of transitions as the chain of events for the linearization of an occurrence net segment of the Petri net.

5. The method according to claim 4, wherein the searching comprises repeatedly selecting a single transition in the free choice set of transitions as a single linearization from among alternative linearizations according to a minimum linearization time specified by a minimal T-invariant of the Petri net.

6. The method according to claim 5, wherein all possible transitions in the selected free choice set are searched.

7. The method according to claim 1, wherein a linearization according to a minimum linearization time based upon a T-invariant of the Petri-net is selected.

8. The method according to claim 1, wherein communication channels of the CFSM have unbounded capacity.

9. An apparatus synthesizing a message sequence chart (MSC) from a communicating finite-state machine (CFSM), comprising:
    computing hardware to execute:
        transforming the CFSM to a Petri net model,
        generating a labeled finite digraph with each path representing a chain of events as a linearization of an occurrence net segment of the Petri net,
        decomposing the labeled finite diagraph derived from the CFSM into segments, and mapping each decomposed segment of the labeled finite digraph derived from the CFSM to respective MSCs for output of a compositional MSC based upon the mapped to MSCs.

10. The apparatus according to claim 9, wherein the computing hardware further harmonizes communication semantics of the CFSM with the MSC by specifying a plurality of First-In-First-Out (FIFO) message channels among a plurality of CFSMs according to a message type.

11. The apparatus according to claim 9, wherein the transforming of the CFSM to the Petri net model comprises:
   mapping each state of the CFSM states to a place of the Petri net;
   marking each place corresponding to initial states from among the CFSM states;
   modeling the message channels as places of the Petri net; and
   modeling alternative state transitions as non-deterministic choices by inserting a silent transition,
   wherein the generating the labeled finite digraph comprises searching states of the Petri net according to a firing of a transition in a free choice set of transitions to obtain a sequence of transitions as the chain of events for the linearization of an occurrence net segment of the Petri net.

12. The apparatus according claim 9, wherein the generating of the labeled finite digraph comprises searching states of the Petri net according to a firing of a transition in a free choice set of transitions to obtain a sequence of transitions as the chain of events for the linearization of an occurrence net segment of the Petri net.

13. The apparatus according to claim 12, wherein the searching comprises repeatedly selecting a single transition in the free choice set of transitions as a single linearization from among alternative linearizations according to a minimum linearization time specified by a minimal T-invariant of the Petri net.

14. The apparatus according to claim 13, wherein all possible transitions in the selected free choice set are searched.

15. The apparatus according to claim 9, wherein a linearization according to a minimum linearization time based upon a T-invariant of the Petri-net is selected.

16. The apparatus according to claim 9, wherein communication channels of the CFSM have unbounded capacity.

* * * * *

UNITED STATES PATENT AND TRADEMARK OFFICE
CERTIFICATE OF CORRECTION

PATENT NO. : 8,577,665 B2  
APPLICATION NO. : 12/048648  
DATED : November 5, 2013  
INVENTOR(S) : Praveen Murthy et al.

Page 1 of 1

It is certified that error appears in the above-identified patent and that said Letters Patent is hereby corrected as shown below:

On the Title Page, In Column 1 Item (56) (Publications), Line 2, Delete "Communicationg" and insert -- Communicating --, therefor.

On the Title Page, In Column 2 Item (56) (Publications), Line 11, Delete "fo" and insert -- of --, therefor.

In the Claims
In Column 16, Line 4, In Claim 12, delete "according claim 9," and insert -- according to claim 9, --, therefor.

Signed and Sealed this
Eleventh Day of February, 2014

Michelle K. Lee
*Deputy Director of the United States Patent and Trademark Office*